United States Patent

Shalders

[15] 3,635,315
[45] Jan. 18, 1972

[54] SPRING APPLIED EMERGENCY BRAKE

[72] Inventor: Alan John Shalders, Tolworth, England
[73] Assignee: A.C.E. Machinery Limited
[22] Filed: Nov. 26, 1969
[21] Appl. No.: 880,125

[30] Foreign Application Priority Data

Dec. 9, 1968    Great Britain ...................... 58,407/68

[52] U.S. Cl. .............................................. 188/189, 188/44
[51] Int. Cl. .................................. F16d 59/00, B61h 11/02
[58] Field of Search ............................ 188/44, 136, 187–189

[56] References Cited

UNITED STATES PATENTS

| | | | |
|---|---|---|---|
| 1,165,583 | 12/1915 | Farmer | 188/189 |
| 2,717,663 | 9/1955 | Higgins | 188/44 |
| 3,215,231 | 11/1965 | Lodige | 188/189 |

*Primary Examiner*—Duane A. Reger
*Attorney*—Norris & Bateman

[57] ABSTRACT

An emergency brake mechanism for use in the cage of a hoist comprising a pair of brake members spring-biased towards opposed cooperating surfaces on a hoist tower, said brake members being linked through a spring relief means which ensures a gradual application of the brake members.

5 Claims, 3 Drawing Figures

Inventor
ALAN JOHN SHALDERS
Attorneys
Norris & Bateman

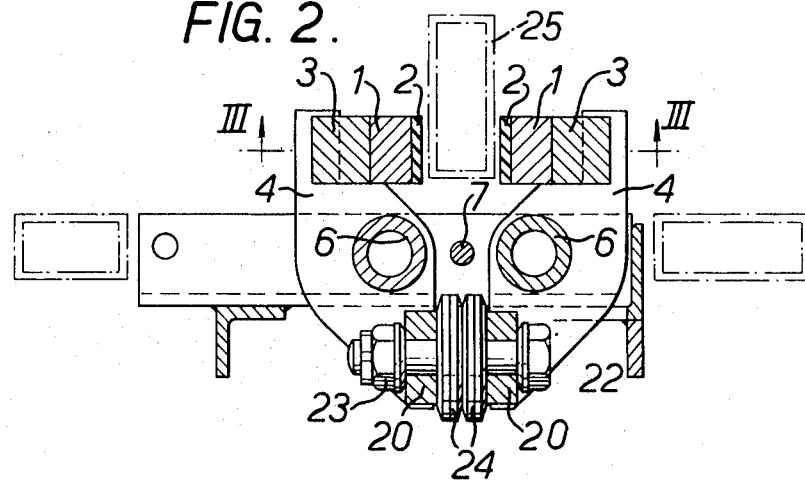
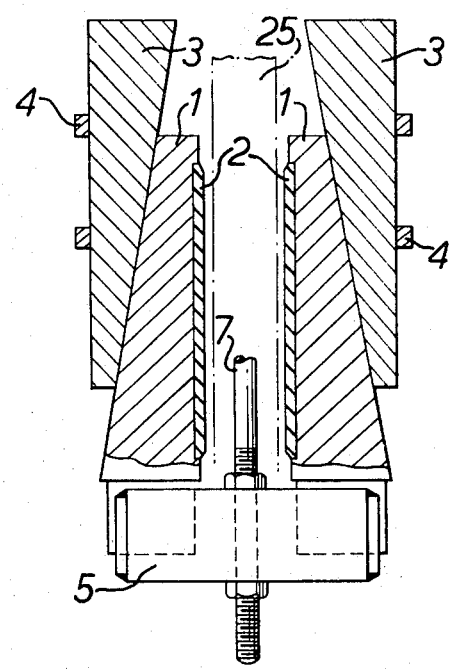

SPRING APPLIED EMERGENCY BRAKE

The invention relates to hoists of the type used on building sites and is particularly concerned with emergency brake mechanisms for use in the cages of such hoists.

In the operation of hoists it is highly desirable to have an emergency brake situated on the hoist cage adjacent a part of the hoist tower to arrest the cage in the event of cable failure or failure in the winding mechanism. The brake normally includes a pair of brake members spring-biased towards cooperating surfaces carried by or on the tower and held therefrom by a member under the control of an overspeed governor linked to a follower roller running against the side of the tower. The brake is normally arranged to be actuated by excessive speed in either direction.

A disadvantage with existing emergency brake mechanisms is that they operate with a "grab" or "snatch" action which brings a cage to an abrupt halt and can cause injury to occupants of the cage by throwing them about when the emergency brake mechanism operates.

The present invention aims to provide an emergency brake mechanism in which the brakes are applied gradually to avoid the abrupt halt of the cage encountered with the existing brake mechanisms.

According to the invention, there is provided an emergency brake mechanism for use in the cage of a hoist comprising a pair of brake members spring-biased towards opposed cooperating surfaces on a hoist tower, said brake members being linked through a spring relief means to ensure a gradual application of the brake members. The spring relief means preferably takes the form of a number of disc springs or dished washers.

The brake members may take the form of wedge-shaped brake shoes arranged, upon actuation, to run up a pair of inclined surfaces and to be forced into engagement with braking surfaces on a guide rail on the hoist tower. The braking surfaces may be provided on the outer surfaces of the rail or on the inner surfaces of a channel-shaped rail.

The inclined surfaces are preferably mounted on support members which are independently pivoted on vertical axes and are connected by the spring relief means so that, on initial actuation of the brake the brake members run up the inclined surface and force the supports against the spring means which then return to apply the brakes firmly.

In an embodiment of the invention, a hoist tower is built up on two or more parts from triangular sections connected together by spigot joints and socket joints. The sections each carry a vertical guide rail, comprising a substantially rectangular welded tube, each guide rail section also being connected by spigot joints.

An emergency brake mechanism according to the invention is mounted on a frame which is secured to a cage for the hoist and the brake mechanism is arranged to be actuated by an overspeed governor controlled by a follower moving along the guide rail.

The invention will now be further described, by way of example, with reference to the accompanying drawings, in which:

FIG. 2 is a section on line II—II in FIG. 1; and

FIG. 3 is a section on line III—III in FIG. 2.

Figure 1:
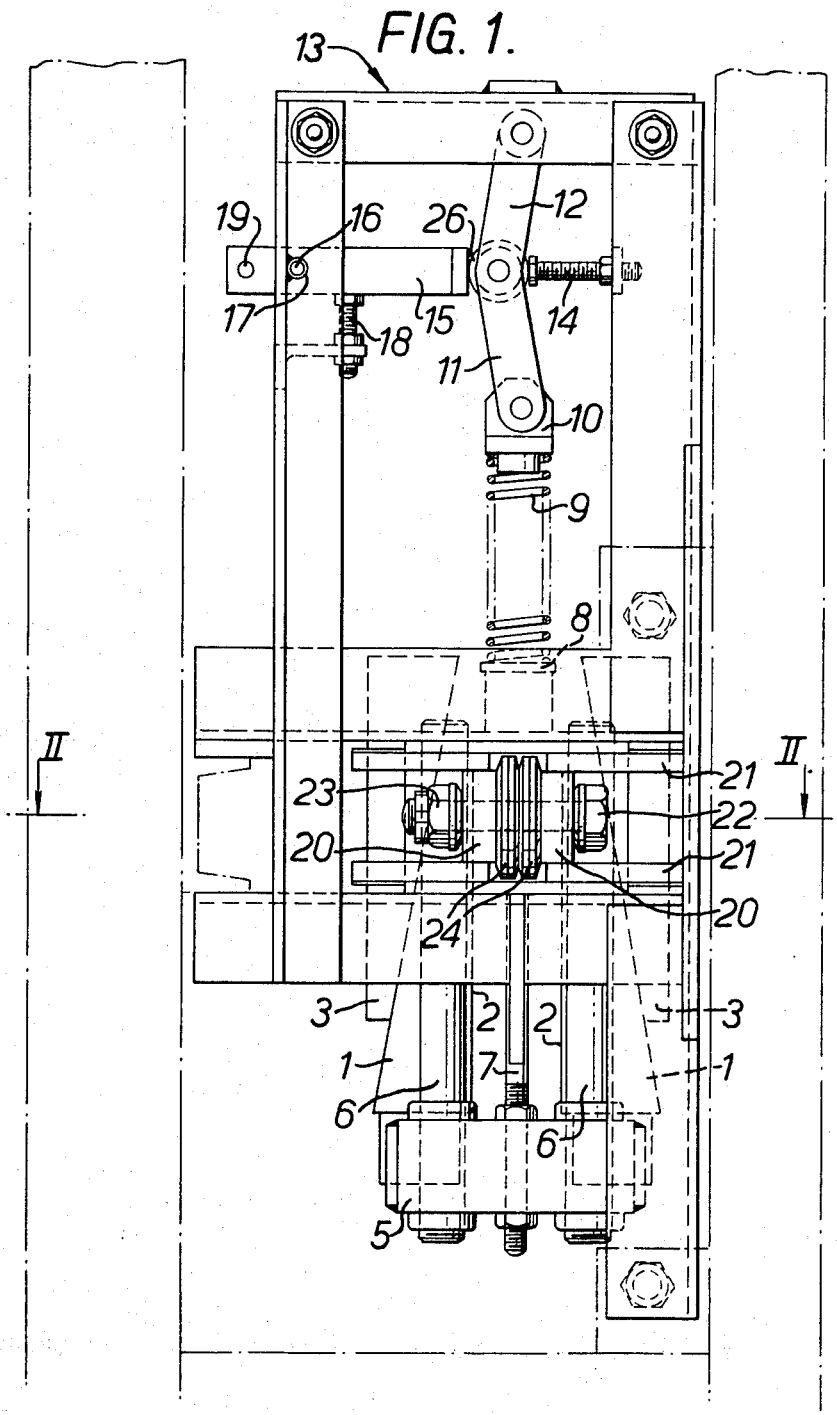
FIG. 1 is an elevation of one embodiment of an emergency brake mechanism according to the invention.

Referring to the drawings, the emergency brake mechanism comprises a pair of brakeshoe or like members 1 provided on their facing surfaces with linings 2. As shown in the drawings, the brakeshoes 1 are wedge shaped and are engageable with a pair of correspondingly shaped brake support members 3 which are held in brackets 4 as shown in FIG. 2. The larger ends of the brakeshoes 1 are slidably received in a bracket 5 to which a pair of guide rods 6 are secured. The guide rods 6 pass through the brackets 4 and act as pivot pins for said brackets. A rod 7 is also secured to the bracket 5 and carries a collar 8 and a coil spring 9. The coil spring 9 bears at one end against the collar 8 and at the other end against a head member 10 provided at the upper end of rod 7. The head member 10 is provided with a pivot for one end of a lever 11 the other end of which is pivotally connected to a lever 12 which in turn is pivotally connected to a frame 13 for the mechanism. The levers 11 and 12 form a toggle linkage which is normally held at its center pivot against an adjustable stop 14 mounted on the frame 13 by a lever 15 which is pivotally mounted on a pin 16 on the frame. The lever 15 is arranged to be held in the position shown in the drawings by means of a coil spring 17 which urges said lever against an adjustable stop 18. The lever 15 is also provided with a bore 19 whereby said lever may be connected to the release lever of an overspeed governor (not shown).

The brackets 4 are provided with lugs 20 which are received in channel members 21 on the frame 13. The brackets 4 are connected by means of the lugs 20 by providing each of said lugs with a bore through which a bolt 22 is passed to be engaged by a nut 23. Disc springs 24 are provided on the bolt between the lugs.

The frame 13 of the mechanism is mounted on a cage for a hoist with the brakeshoes 1 arranged on either side of a guide rail 25 of the hoist as shown in FIG. 2. When the cage is operated normally, the various component parts of the brake mechanism assume the position illustrated in the accompanying drawings.

In the event of the cage exceeding a predetermined speed, the overspeed governor is effective to cause the release lever to release lever 15. The lever 15 is forced by coil spring 17 to pivot about pin 16 and to move clear of the toggle linkage 11,12. This linkage is forced upwardly by the spring 9 and the rod 7 and bracket 5 are also forced upwardly. The brakeshoes 1 are entrained by the bracket 5 and act against the brake support members 3 which are urged away from each other and cause the brackets 4 to pivot about the guide rods 6 and compress the disc springs 24. The disc springs reexert themselves and force the brake support members 3 towards each other which in turn act on the brakeshoes 1 to force the linings 2 against the guide rail 25 to progressively slow and finally halt the cage. The return action is gradual so that the brakes do not operate with a snap action but are applied progressively and firmly thus preventing the cage from "grabbing" or "snatching" during emergency braking.

The brake mechanism can be adjusted for any suitable cage and hoist as follows. The first adjustment is to the stop 18, which may take the form of a bolt passing through a bore in a lug on the frame 13 and secured to the lug by a pair of locknuts. The stop is so arranged that when the lever 15 is held by the release lever, said lever 15 is substantially horizontal. A disc 26 is preferably provided on the pivot between levers 11 and 12 and one side of the disc bears against the end of lever 15. The stop 14 is adjusted so that there is a clearance of 0.002–0.005 inch between the end of the stop and the disc 26. The stop may take the form of a bolt engageable in a screw-threaded bore in the frame 13 and securable by means of a locknut. The adjustable stop 14 is provided to ensure that the toggle linkage 11,12 cannot pass through the center position and thereby render the lever 15 inoperative.

The third adjustment is to the nut 23 and bolt 22 which are tightened until the disc springs 24 are under a predetermined desired tension in the inoperative position of the brake mechanism. The fourth and final adjustment is to the spring rod 7 the effective length of which is adjusted to give the coil spring 9 a working length of about 4½ inch. This adjustment is preferably achieved by providing the end of the rod remote from head member 10 with a screw thread which is engaged by a pair of nuts one on each side of the bracket 5.

I claim:

1. An emergency brake mechanism for use in the cage of a hoist having opposed guide surfaces, said brake mechanism being normally retracted and spring-biased toward said guide surfaces, said brake mechanism comprising a pair of relatively movable brake members linked by spring relief means and having inclined surfaces, a pair of relatively movable wedge-shaped brakeshoes adjacent said guide surfaces, said inclined surfaces being arranged, when the brake mechanism is energized to move said brakeshoes toward applied position, to be engaged by said brakeshoes which are displaced thereby toward said opposed guide surfaces, said spring relief means providing gradual brake application.

2. The brake mechanism defined in claim 1, wherein said brake members are independently pivoted about spaced parallel axes, and said brakeshoes are disposed laterally between said inclined surfaces and at opposite sides of a guide rail providing said guide surfaces.

3. A mechanism as claimed in claim 1, wherein the spring relief means comprise a number of disc springs or dished washers.

4. A mechanism as claimed in claim 1, wherein said opposed braking surfaces are provided on the outer surfaces of the guide rail.

5. A mechanism as claimed in claim 1, wherein the guide rail is channel shaped and said opposed braking surfaces are provided on the inner surfaces of said channel.

* * * * *